US006714846B2

(12) United States Patent
Trsar et al.

(10) Patent No.: US 6,714,846 B2
(45) Date of Patent: Mar. 30, 2004

(54) DIAGNOSTIC DIRECTOR

(75) Inventors: Dale A. Trsar, Mt. Prospect, IL (US); Keith A. Kreft, Cupertino, CA (US); James J. Cancilla, San Jose, CA (US); Bradley R. Lewis, Gilroy, CA (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/102,045

(22) Filed: Mar. 20, 2002

(65) Prior Publication Data

US 2002/0138185 A1 Sep. 26, 2002

Related U.S. Application Data

(60) Provisional application No. 60/276,951, filed on Mar. 20, 2001.

(51) Int. Cl.[7] .................................................. G06F 7/00
(52) U.S. Cl. .......................................................... 701/33
(58) Field of Search ............................. 701/29, 30, 33, 701/36

(56) References Cited

U.S. PATENT DOCUMENTS

| | | | |
|---|---|---|---|
| 4,418,388 | A | 11/1983 | Allgor et al. |
| 4,658,370 | A | 4/1987 | Erman et al. |
| 4,796,206 | A | 1/1989 | Boscove et al. |
| 5,195,173 | A | 3/1993 | Gordon et al. |
| H1273 | H | 1/1994 | Novick |
| 5,337,320 | A | 8/1994 | Kung |
| 5,338,189 | A | 8/1994 | Hata et al. |
| 5,408,412 | A | 4/1995 | Hogg et al. |
| 5,408,871 | A | 4/1995 | Lieder et al. |
| 5,442,549 | A | 8/1995 | Larson |
| 5,522,363 | A | 6/1996 | Gotoh |
| 5,533,093 | A | 7/1996 | Horton et al. |
| 5,533,332 | A | 7/1996 | Uchikawa |
| 5,541,840 | A | 7/1996 | Gurne et al. |
| 5,546,795 | A | 8/1996 | Yamagishi |
| 5,550,762 | A | 8/1996 | Doll |
| 5,568,725 | A | 10/1996 | Uchikawa |
| 5,575,267 | A | 11/1996 | Matsumoto et al. |
| 5,614,664 | A | 3/1997 | Yamagishi |
| 5,631,831 | A | 5/1997 | Bird et al. |
| 5,640,846 | A | 6/1997 | Ohuchi et al. |
| 5,644,073 | A | 7/1997 | Matsuno et al. |
| 5,729,452 | A | 3/1998 | Smith et al. |
| 6,141,608 | A | 10/2000 | Rother |

FOREIGN PATENT DOCUMENTS

| | | |
|---|---|---|
| GB | 2 350 443 A | 11/2000 |
| JP | 63-101731 | 5/1988 |

*Primary Examiner*—Yonel Beaulieu
(74) *Attorney, Agent, or Firm*—Seyfarth Shaw LLP

(57) ABSTRACT

A diagnostic system includes a host system having a processor, storage media and a user interface including a display screen, and a plurality of support data sources, which may be resident at or remote from the host system. The storage media stores service or maintenance test designations and descriptions. System software responds to user selection of displayed vehicle systems or symptoms to be diagnosed by displaying test designations. Upon user selection of a test designation, the system displays the first page of the test description and simultaneously links to appropriate support data sources and displays pertinent support data on a portion of the display screen. A method includes selecting and displaying test descriptions and, in response to each such display, automatically retrieving and displaying related data from a support data source.

30 Claims, 10 Drawing Sheets

DIAGNOSTIC DIRECTOR

RELATED APPLICATION

This application claims the benefit of the filing date of copending U.S. Provisional Application No. 60/276,951, filed Mar. 20, 2001.

BACKGROUND

This application relates generally to test and diagnostic systems for machines or other operating apparatus, and has particular application to automotive vehicles, particularly vehicles powered by internal combustion engines. This application relates to a diagnostic system which is an improvement of that disclosed in U.S. Pat. No. 6,141,608, the disclosure of which is incorporated herein by reference.

While the application describes a diagnostic system in the context of an automotive engine analyzing system, the principles of the invention are useable with other types of vehicle diagnostic systems, such as air conditioning testing and servicing systems, wheel balancing systems, automotive gas emissions analysis systems, and the like, and are also useable for diagnosing faults in non-automotive apparatus.

In the system of U.S. Pat. No. 6,141,608, after entering vehicle identification information, the user is presented with a display of fault-based files including symptoms and service codes of the apparatus under diagnosis, as well as a file of components or systems of the apparatus which can be tested. The user selects from one of these files the particular items which apply to the problem being experienced in the apparatus under diagnosis. Then, if the selection is from a fault-based file, the system automatically selects from a stored library a list of possible causes of the symptoms or service codes and a counterpart list of test procedures to be performed to check for those causes. The test procedures are listed in the order of the probability or likelihood that the test will be successful in diagnosing the cause of the selected symptoms or fault codes. If the selection was from the component/system file, the system automatically selects tests related to the selected component or systems. The user can then select one of the displayed test procedures and the system will then launch or initiate that procedure.

The screen may also display a series of icons corresponding to "tool" modules useful in performing the selected test, which modules can then be user-selected to bring up on the screen certain data or information to guide the user in the use of the selected tool in performance of the selected test. This information could also be accessed in other ways. When that test is completed, the user would then return to the test list screen and select another test, which might then present a different set of "tool" module icons useful in performing that test, from which the user would again select.

In the operation of that system, the user must make an affirmative selection at each step. Furthermore, the storage media on which the system operating programs and databases are stored, are limited to those resident at the system processor, typically a personal computer.

SUMMARY

This application describes a diagnostic system which improves upon and expands the diagnostic system of U.S. Pat. No. 6,141,608, avoiding disadvantages thereof while affording additional structural and operating advantages.

An aspect of the system described herein is that it automatically provides a link to support data pertinent to a selected diagnostic test procedure.

Another aspect of the system is that it provides for automatic simultaneous display of a description of a test procedure and support data related to that test procedure.

A still further aspect is the provision of storage media which may be remote from the processing and display devices, and the provision of means for accessing communication links to those remote units.

A still further aspect is the provision of an expert support database including diagnostic tips and procedures compiled from actual experience in servicing and diagnosing the specific apparatus under diagnosis.

Another aspect is the provision of a system which can be implemented in a PC-based or hand-held diagnostic tool-based system.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
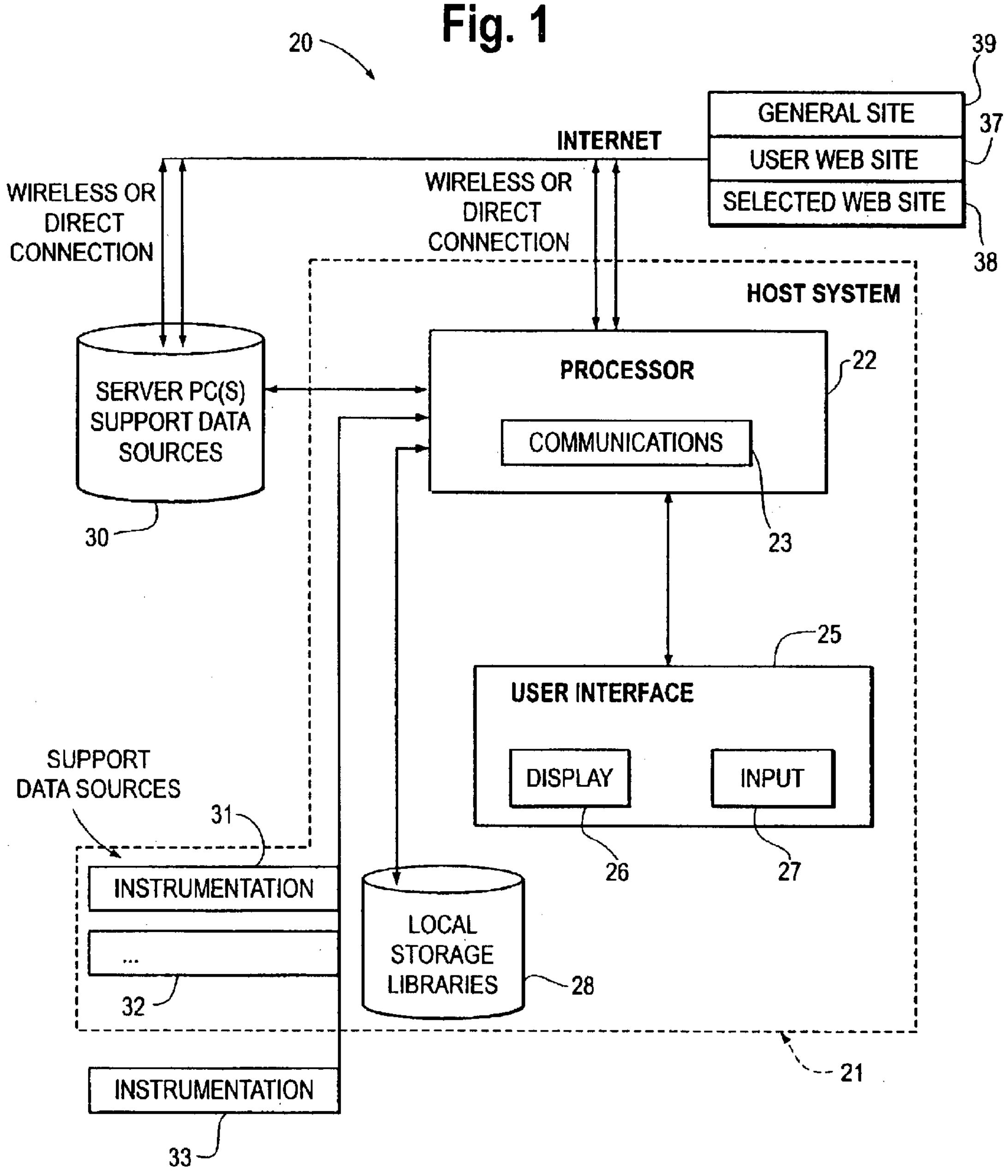
FIG. 1 is a functional block diagram of a diagnostic system as described herein.

Referring to FIG. 1, there is shown a block diagrammatic illustration of a diagnostic system, generally designated by the numeral 20, which includes a host system 21, which could be a PC-based system or a hand-held diagnostic system. Whichever type of host system 21 is utilized, it will include a processor 22 which will include communications circuitry 23 to provide communications with associated utilities. The system 20 includes a user interface 25, which will include a suitable display 26 and an input device 27. The nature of the display 26 and the input device 27 will vary, depending upon the nature of the host system 21. Thus, for example, if the host system 21 is a PC-based system, the display 26 may be a CRT display screen and the input device 27 may be a keyboard and/or mouse, whereas if the host system 21 is a hand-held diagnostic system, the display 26 may be an LCD display screen and the input device 27 may be a built-in navigational controls or keypad.

The system 20 includes a local storage utility 28, which will typically include suitable ROM and RAM and, depending upon the nature of the host system 21, may include a hard drive, a floppy drive, a CD ROM drive and the like. The local storage utility 28 will typically store programs for execution by the processor 22 and may also store a knowledge database of the type described in the aforementioned U.S. Pat. No. 6,141,608, which includes libraries of files relating to aspects of a vehicle or other apparatus, the files including fault-based files, such as "Symptoms" and "Service Codes," as well as a "Component/System" file listing various components and subsystems of vehicles or other apparatus which may be tested, as well as a file listing task-based service or maintenance procedures relating to such apparatus. These files are collectively referred to as a "Service Library" 43 in FIG. 2, and the information items stored thereon may be referred to as "service information items." Also stored in this utility is a "Test Library" 42 of "test information items" relating to procedures (see FIG. 2) which can be utilized to perform selected maintenance or service tasks, test selected components or systems or diagnose selected symptoms. The test information items include test designations and links to test descriptions or instructions.

The processor 22 may also be connected to an external server 30, and may also be connected to one or more instrumentation support data sources, three of which are designated at 31, 32 and 33, although it will be appreciated that any number could be provided. Again, depending upon the nature of the host system 21, the instrumentation data sources may be resident at the host system, such as sources 31 and 32, or may be external thereto, such as data source 33. Examples of such instrumentation-type data sources are a scanner linked to on-board diagnostics ("OBD"), which may be an on-board monitoring and control device such as an ECU, a graphical/digital volt-ohm meter, a laboratory oscilloscope, various sensors, such as temperature, acoustic and vibration sensors, a frequency meter, a dynamometer, such as a gas analysis dynamometer, an emissions testing bench, and the like.

The processor 22 and/or the server 30 may be adapted to be connected to the Internet, through suitable modems (not shown) or dedicated communication links, in a known manner. As is indicated, these links could be wired or wireless. Similarly, it will be appreciated that other communication links in the system 20, such as the various communication links between the processor 22 and the server 30, the instrumentation data sources 31–33 and the like could, if desired, also be wireless rather than direct-connection, wired links. The processor 21 and/or the server 30 are connectable via the Internet to various remote support data sources, which may be resident at Internet Web sites. These may include a one or more sites 37 proprietary to the user, pre-selected sites or specific pages of sites 38 which have been predetermined to be pertinent to a specific diagnostic test routine, or sites 39 which may be accessed through a browser on an ad hoc basis. It will also be appreciated that other support data sources could, if desired, be resident at the server 30 in suitable storage media.

The non-instrumentation support data sources may include a variety of different text and/or graphics data sources including, for example, but not limited to, manufacturer's diagnostic procedures, such as service manuals, service bulletins or the like, third-party independent diagnostic procedures and manuals, expert diagnostic tips and procedures compiled by a user entity, libraries of component locations, libraries of connectors and connection points, libraries of circuit diagrams and mechanical system diagrams, video libraries, waveform libraries, etc.

As was indicated above, some of the support data sources may include case-based, expert databases or libraries, compiled by technicians and service personnel from actual field diagnostic and service experience. Collection of some of this information may be done automatically, as described, for example, in the aforementioned U.S. Pat. No. 6,141,608. The library 42 of diagnostic tests, described above as included in the local storage utility 28, may also be generated from actual field experience, as well as other sources.

Figure 2:
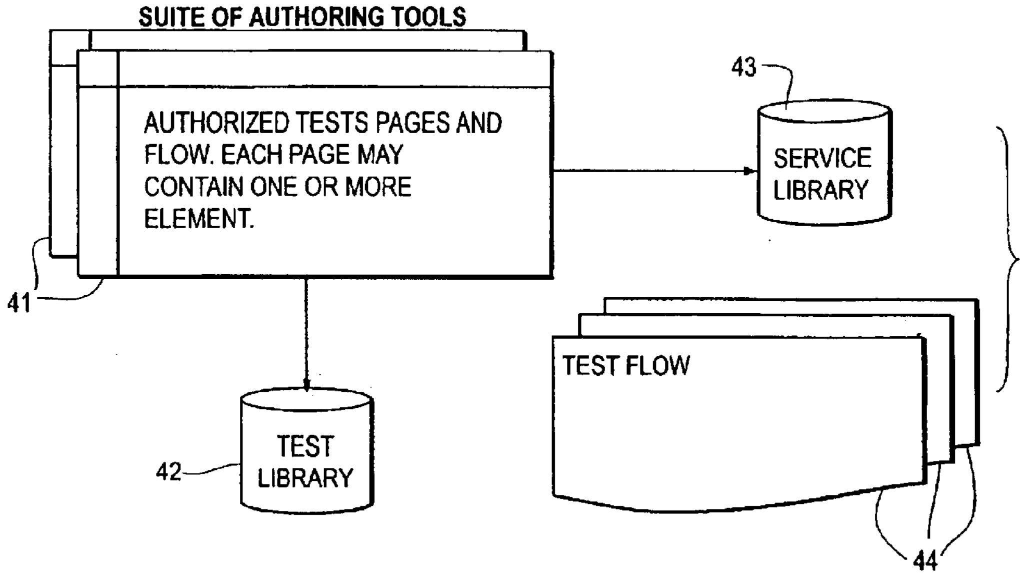
FIG. 2 is a flow diagram of a technique for authoring certain support information for the system of FIG. 1.

Referring to FIG. 2, there is shown a diagram 40, generally illustrating the authoring technique. Individual pages 41 are generated listing specific diagnostic tests and service procedures, systems or components of an apparatus which may be tested, and symptoms to be diagnosed which might indicate use of such tests. As the individual authored pages 41 are generated, the tests are added to the test library 42 and the systems, components, procedures or symptoms are added to the service library 43 and the two are linked through the associated test page or pages 41. Thus, when the user inputs symptoms to be diagnosed or systems or components to be tested or service tasks to be performed, the processor will generate a list of the test designations applicable to that system, component, service task or set of symptoms and, in the case of symptoms, prioritize the list in the manner described in U.S. Pat. No. 6,141,608. Proprietary support data sources may also be compiled in this manner and linked to specific tests in the test library 42.

Figure 3:
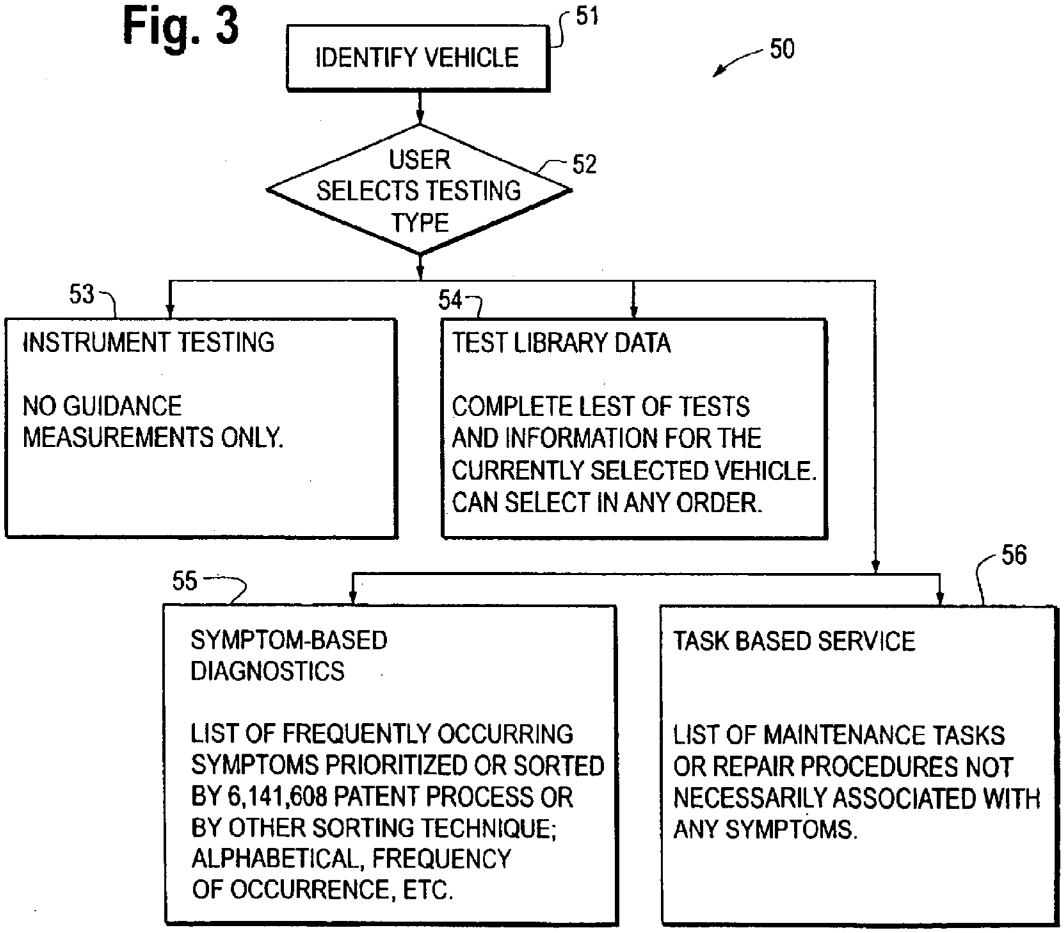
FIG. 3 is a flow chart diagram of a preliminary portion of the system operation.

Referring now to FIG. 3, there is illustrated a functional block diagram 50 indicating initial phases of the use of the system 20. Initially, at 51, the user will identify the vehicle by inputting appropriate vehicle identification information through the user interface 25. This step is described generally in the aforementioned U.S. Pat. No. 6,141,608, and could be done through interactive menus and screen prompts on the display 26. This could be done by a technician operator or, alternatively, if the system is being utilized at a service or repair facility, the service order writer could input this information. Then, at 52, the user selects the testing approach to be utilized, four such approaches being illustrated at 53, 54, 55 and 56.

One approach, illustrated at 53, is simple instrument testing, wherein the user would directly test the apparatus under diagnosis utilizing specific instruments, at his discretion. There would be no guidance in this approach by the system, and the user would simply take measurements as deemed desirable.

In a second approach, illustrated at 54, the user could be presented with the complete list of tests and information, including systems and components, for the currently selected vehicle from the test library 42, with limited or no guidance or distillation by the system, and the user could then select from that library of information whatever tests he or she deemed appropriate.

A third approach, illustrated at 55, is the approach described in the aforementioned U.S. Pat. No. 6,141,608, wherein the user would input a list of symptoms, either manually, such as by selecting from a displayed list, or automatically by reading in data from an instrument, such as a fault code read in via a scanner, whereupon the system would select an appropriate test or tests and prioritize them in the order of their likelihood of success in diagnosing the input condition, and display designations of the tests to the user.

A fourth approach, indicated at 56 is a task-based service approach, in which the user is presented with a list of maintenance tasks or repair procedures not necessarily associated with any symptoms, e.g., procedures associated with routine scheduled maintenance. The user then selects tasks or procedures from the list.

It will be appreciated that in any of the approaches indicated at 53–56, the system 20 will provide linkage between displayed test designations and pertinent support data sources, as will be described more fully below. However, the remainder of the discussion here will presume that the third approach of box 55 in FIG. 3 is being utilized.

Referring now to FIGS. 4–18, the operation of the system 20 will be described. The following description is in the context of the diagnosis of a typical condition in an automotive internal combustion engine. However, it will be appreciated that the principles involved are applicable to diagnosis of other types of vehicle systems or non-vehicle apparatus.

Figure 4:
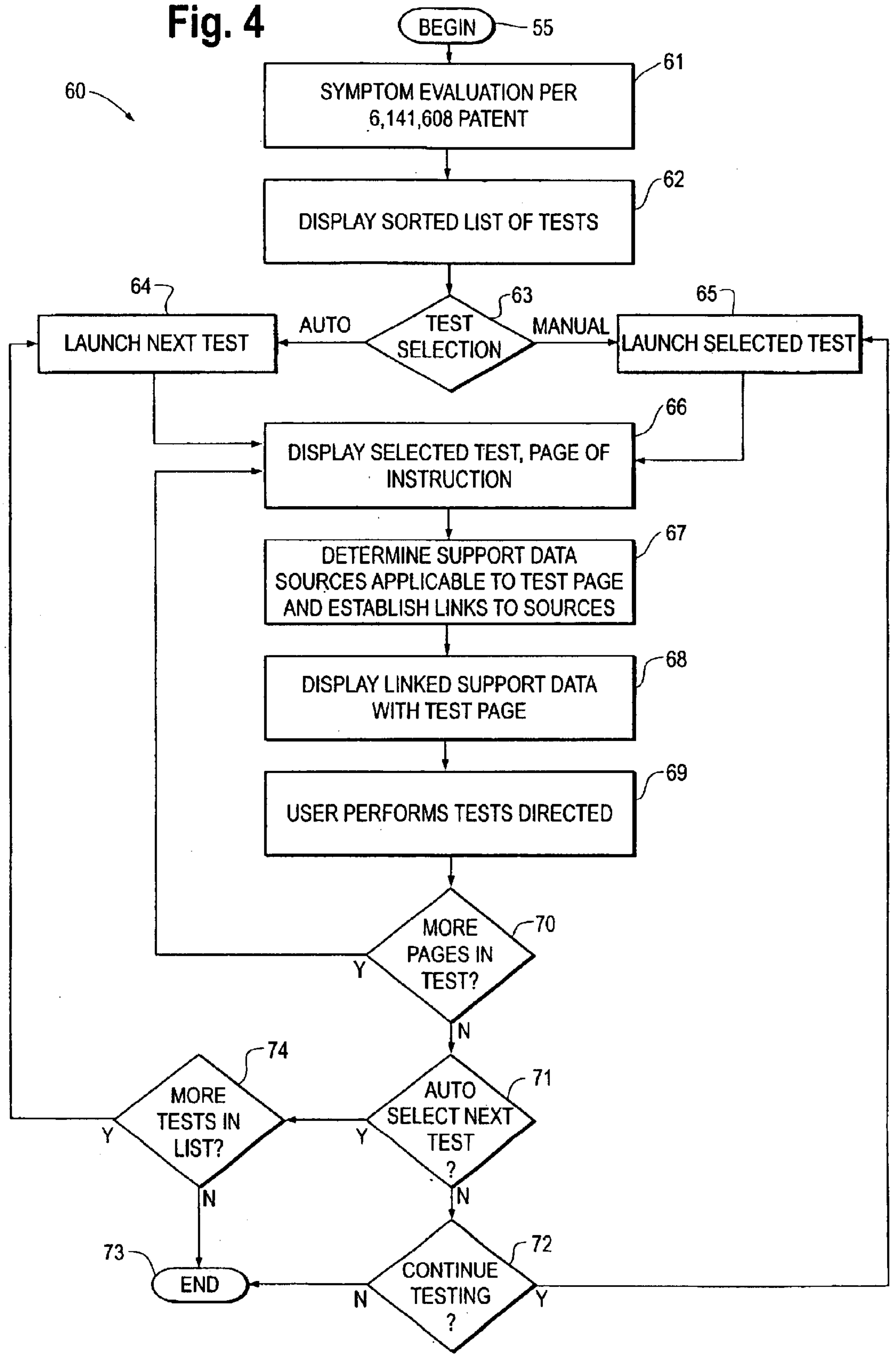
FIG. 4 is a flow chart diagram of the basic system operation.

FIG. 4 is a flow chart 60 illustrating operation of the system. The routine begins at 55 (see FIG. 3) wherein the user has selected use of a symptom-based diagnostics approach, such as that described in U.S. Pat. No. 6,141,608, whereupon the routine, at 61 performs the symptom evaluation and generates a list of test designations appropriate in diagnosing the causes of the inputted symptoms, and sorts or prioritizes that list in accordance with predetermined criteria, such as the likelihood of success in effecting the diagnosis. At 62, the system then, as described in U.S. Pat. No. 6,141,608, displays the sorted list of test designations to the user, whereupon the user may select a specific test designation from the list or proceed automatically through the list of test designations in the hierarchical order in which they have been arranged by the system. Thus, at 63, the system checks to determine whether a test designation has been selected manually by the user or if it is to proceed in automatic mode. If the latter, the system proceeds, at 64, to launch the next test which, if the routine has just been entered, will be the test corresponding to the first test designation in the list. If a user does select a test designation, the system, at 65, launches the corresponding test. In either event, the system automatically links to the appropriate test instruction or description and then, at 66, displays the first page of test instructions for the test being launched and then, at 67, determines the support data sources applicable to the displayed test page and establishes links to the appropriate support data sources. Next, at 68, the system displays the linked support data pages simultaneously with the displayed test page.

Figure 5:
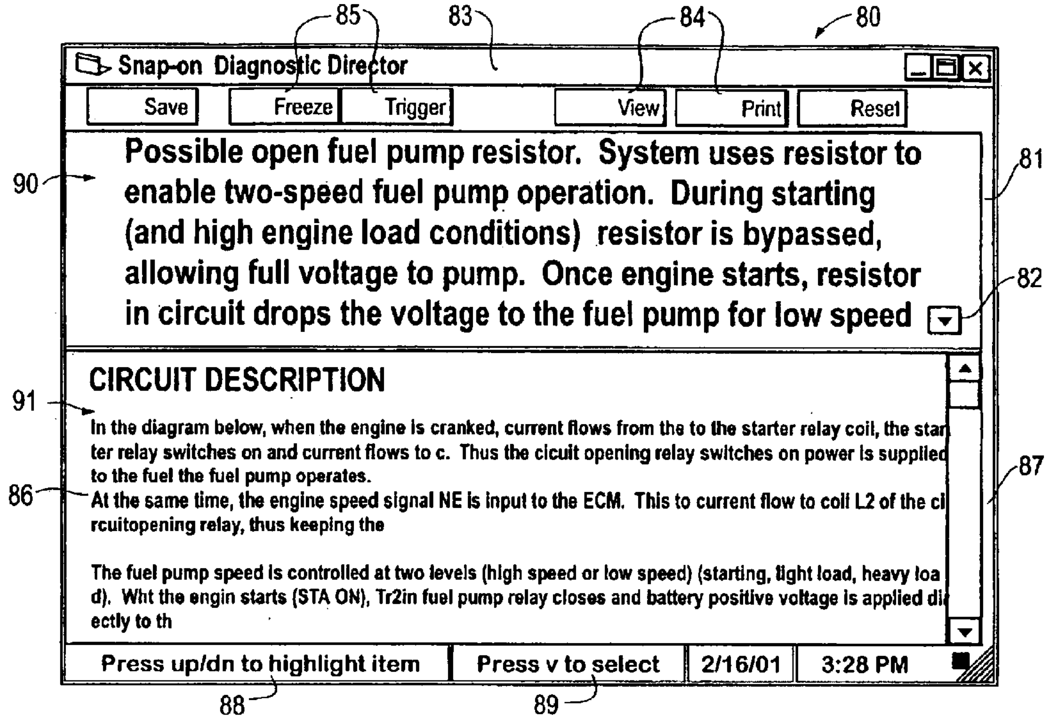
FIGS. 5–18 are screen prints illustrating operation of the system of FIG. 1 during diagnosis of a particular fault condition in an automotive vehicle engine.
Figure 6:
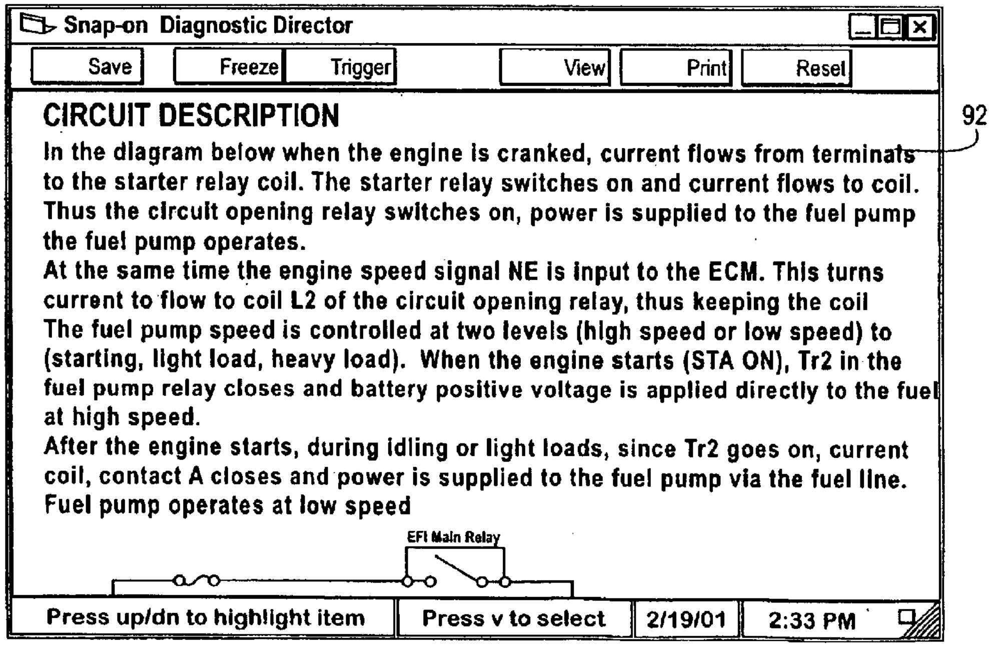

Referring to FIG. 5, there is illustrated a representative display screen 80 arranged in a split-screen format with an upper window 81 and a lower window 86. In the illustrated embodiment, the first page of the test instruction is displayed in the upper window 81, while the corresponding linked support data is displayed in the lower window 86, but it will be appreciated that the software could be designed so that specific information could be displayed at any desired location on the screen. The upper window 81 has a scroll arrow 82 (while only a down arrow is illustrated, it will be appreciated that up and down arrows would typically be provided) and a toolbar 83. Included in the toolbar 83 are a number of icons, including general icons 84 such as "Save", "View", "Print" and "Reset", as well as icons 85 which may be specific to the particular test page being displayed. In the illustrated screen, for example, are "Freeze" and "Trigger" icons, which would typically be used with an instrumentation-type data source which is capturing live data signals from the vehicle engine (or other apparatus being analyzed) for display. The lower window 86 of the screen is also provided with a scroll bar 87, and it can be scrolled independently of the display in the upper window 81. At the bottom of the screen are prompt icons 88 and 89, which may also vary with the particular type of data page being displayed.

FIGS. 5–18 illustrate a series of test that could be used for diagnosis of a symptom or problem that the vehicle cranks and starts, but then dies after starting. The upper window display contains test description information or "expert" advice, which may be a blend of experience-based information and repair guidance relating to the first test in the hierarchically arranged list generated by the system 20. In the screen 80, the first page of the test being displayed is a fault description 90 for a possibly open fuel pump resistor. The text of each such page is supplemented with additional support data, which may be "reference" information retrieved from an existing source or instrumentation or OBD measurements and functions, and are displayed in the lower window 86.

In this case, in the upper window 81 of this screen 80, the automotive technician is given a possible cause, "open fuel pump resistor," and a short explanation of its operation. The support data 91 in the lower window 86 provides a circuit description page from the vehicle manufacturer's service manual, which is being retrieved via a link to this reference, which could be stored either locally or remotely. In this case, the reference includes a fairly complete description of the starting circuit, including a schematic which is scrollable into the window, which may also be enlarged to fill the entire screen, as shown at 92 in FIG. 6.

Referring back to FIG. 4, after display of the test page and the associated support data, the user, at 69. If there are additional pages to the test, the user can scroll to them using the scroll arrow 82 in the upper window 81. Thus, the system next checks, at 70, to see if there are any more pages to the test and, if so, returns to 66. If not, the system checks at 71 to see if it should auto select the next test. If not, it then checks at 72 to see if it should continue testing. If so, it returns to 62 and, if not, exists the routine at 73. If, at 71, the system is to auto select the next test, it then checks, at 74, to see if there are any more tests in the displayed list. If not, the routine ends at 73 and, if so, the routine returns to 64 to automatically launch the next test in the list.

Figure 7:
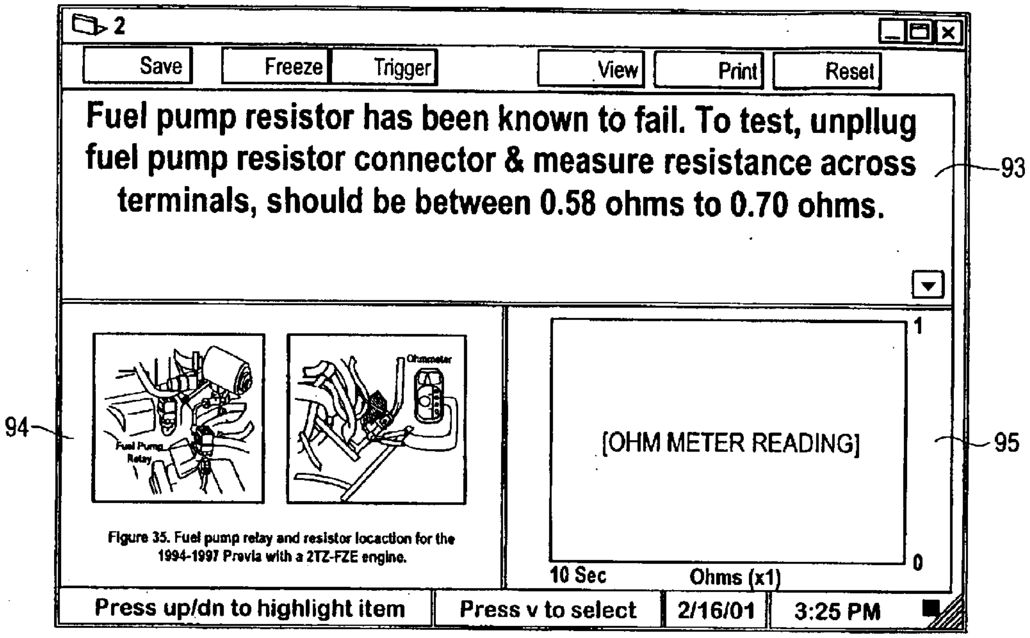
Figure 8:
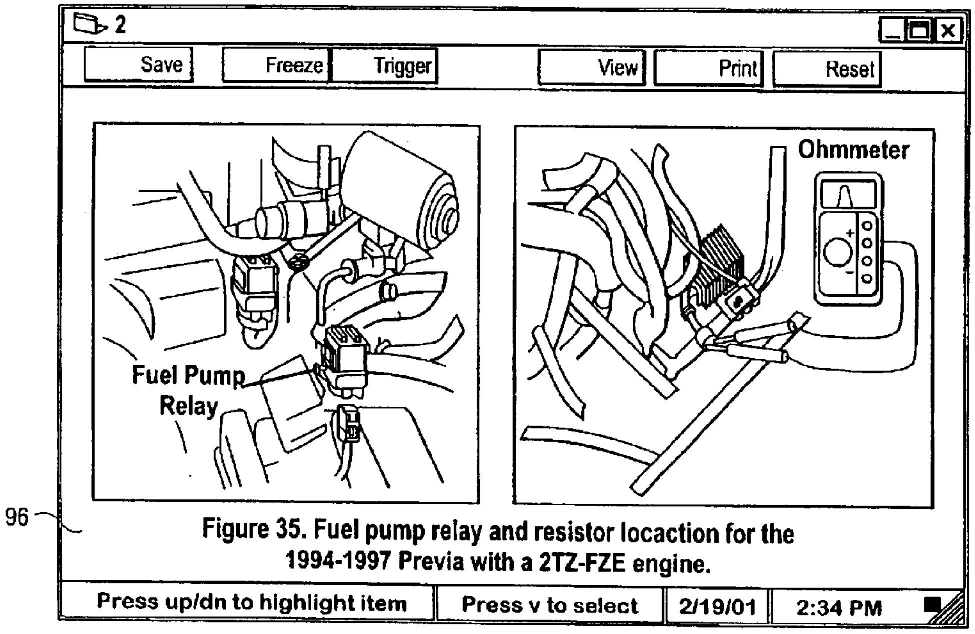

The second test screen 93 in the example list is illustrated in FIG. 7, which is a test to determine whether or not the fuel pump resistor has failed. The technician is advised to check the resistance of the fuel pump resistor and the specification (normal range) is given. The lower window in this case has been subdivided into left-hand and right-hand portions.

The lower left-hand portion 94 provides a link to a page in the service manual which shows the location of the fuel pump relay and resistor. It will be appreciated that the system may be directly linked to an ohm meter, so that the meter reading is graphically displayed in the lower right-hand portion of the screen of 70, which has been configured as a graphing ohm meter 95, with appropriate vertical and horizontal scales, selected based on the expected value of the measurement. Again, any of the windows can be easily enlarged to full screen for better viewing. Thus, referring to FIG. 8, the lower left-hand window has been enlarged to full screen at 96.

Figure 9:
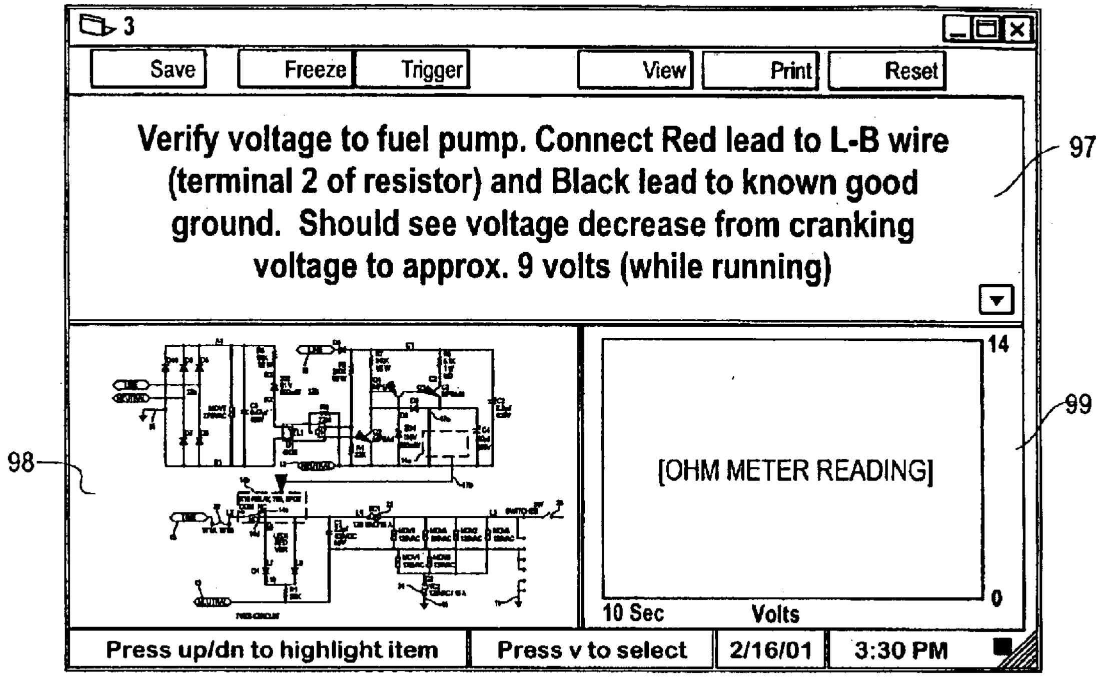

After completion of the second test, scrolling of the upper window 81 will bring up the third test, illustrated in FIG. 9, which suggests that the voltage to the fuel pump be measured (graphed) while the engine transitions from the cranking to the running states. Information on where to make test connections, wire color, terminal numbers, etc. are provided at 97. The lower left-hand window provides a link to a schematic in the service manual showing the electrical connection of the fuel pump resistor in the circuit, as at 98. In this check, the lower right-hand window portion has been configured as a graphing volt meter 99, wherein appropriate vertical and horizontal scales are selected based on the expected value of the measurement, and desired horizontal viewing resolution (time-based).

Figure 10:
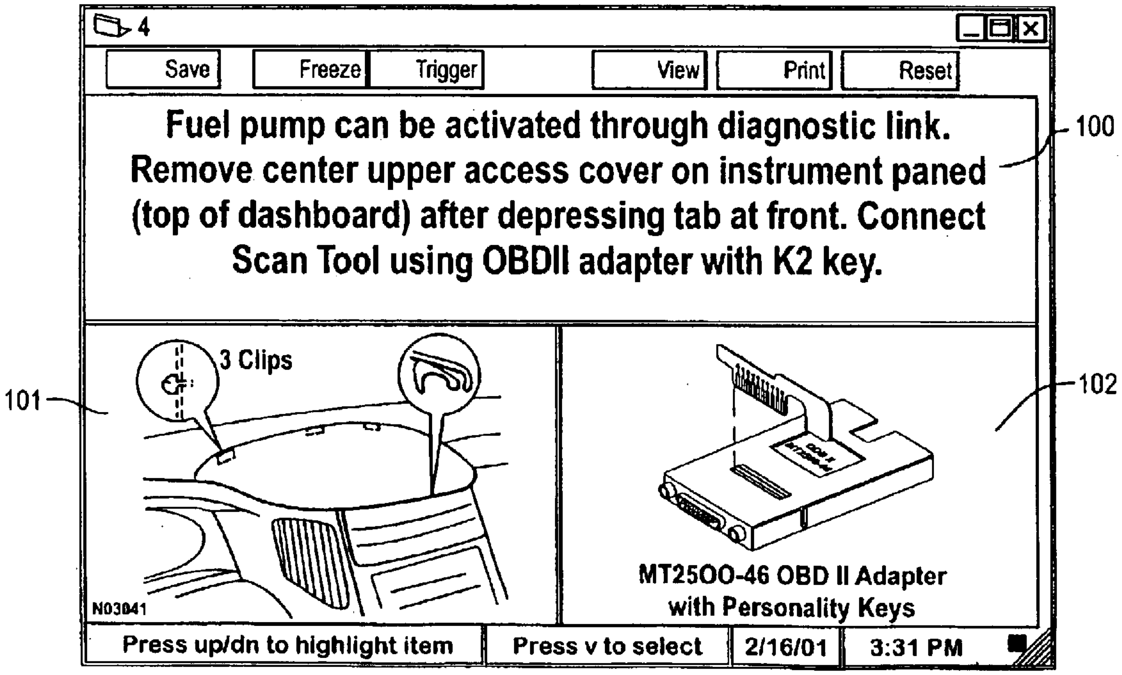

Referring to FIG. 10, there is shown a screen 100 illustrating the next test which, in the upper portion of the screen gives advice on how to activate the fuel pump via the vehicle's OBD link. This requires connection of an automotive scan tool. The support data in the lower window includes, in the left-hand portion a service manual reference at 101 showing where the connector on the vehicle is located, while the lower right-hand portion displays, at 102, an illustration from the scan tool operating instructions showing which scan tool adaptor and key to use.

Figure 11:
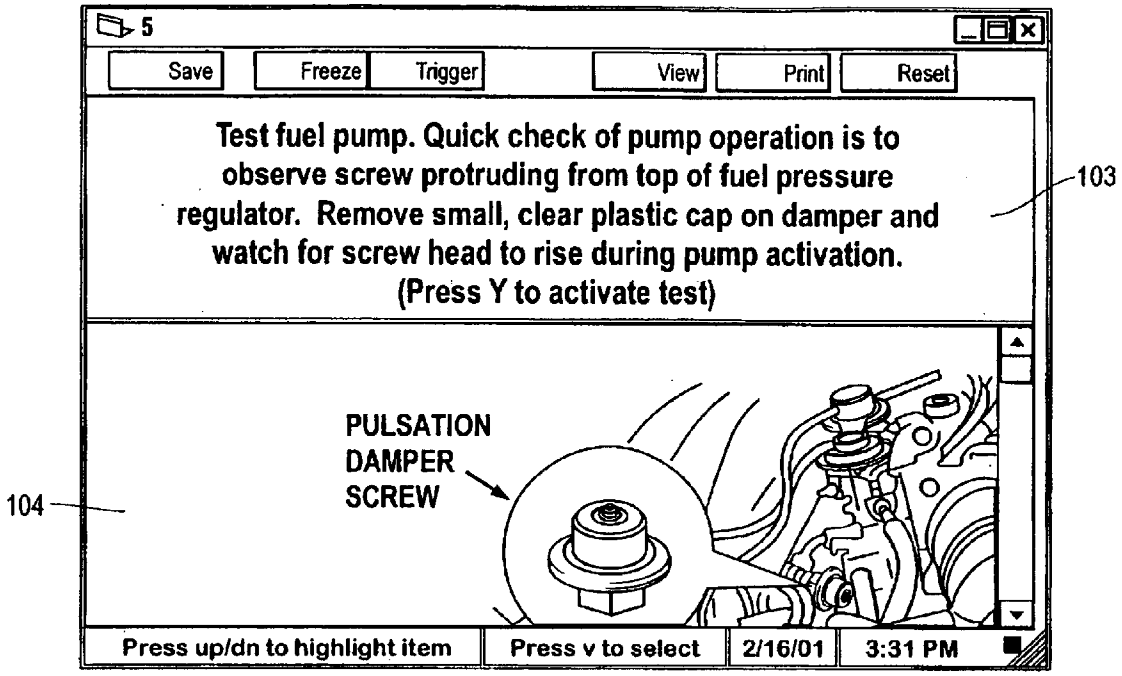
Figure 12:
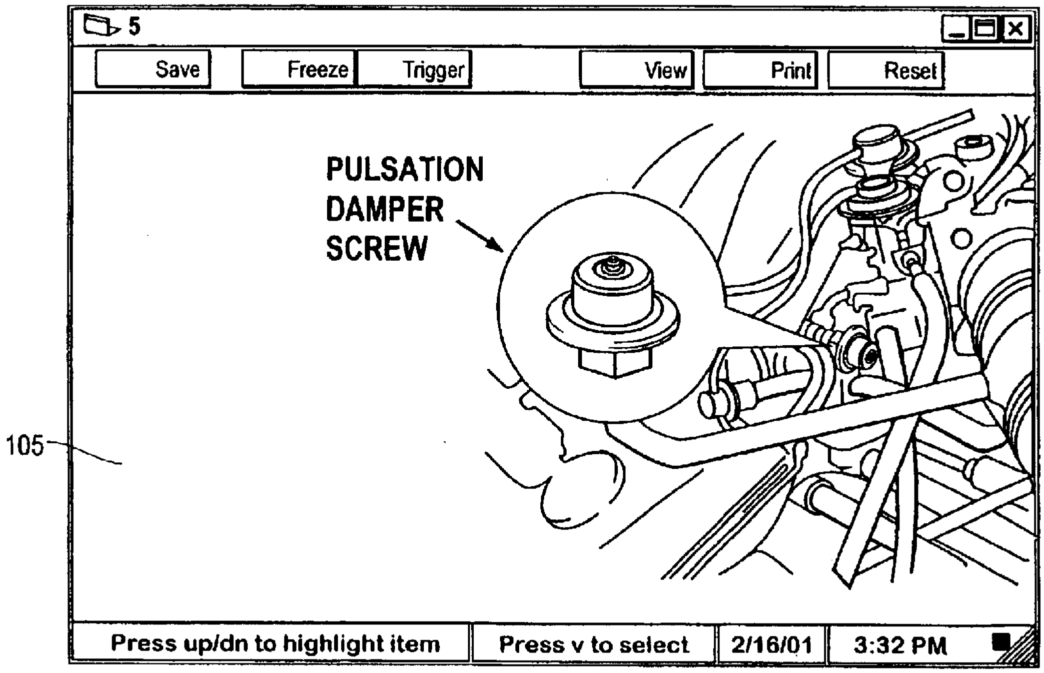

FIG. 11 illustrates a screen display 103 giving information on how best to check for fuel pump operation. With the OBD interface connection made, the functional test for activating the fuel pump can be accessed by pressing the "Y" control on the unit. The ability to activate the fuel pump is one of many functions that a scan tool might perform on a vehicle, dependent upon the capabilities of the specific vehicle. Normally, the technician would have to find or locate the fuel pump activation test from a list of functional tests on the scan tool. He would start at the scan tool main menu and eventually work his way down to the group of tests that contained this particular function. How quickly this test is found is dependent upon his experience, his memory and how the tests and functions are organized on the scan tool. The advantage of the illustrated system is that the technician does not have to leave the displayed test page to find the "fuel pump activation test." A link is already pre-established between this troubleshooting check and functional test. The lower window of the screen is a diagram from the manual of the location of the pulsation damper screw, this screen being shown enlarged in FIG. 12 at 105.

Figure 13:
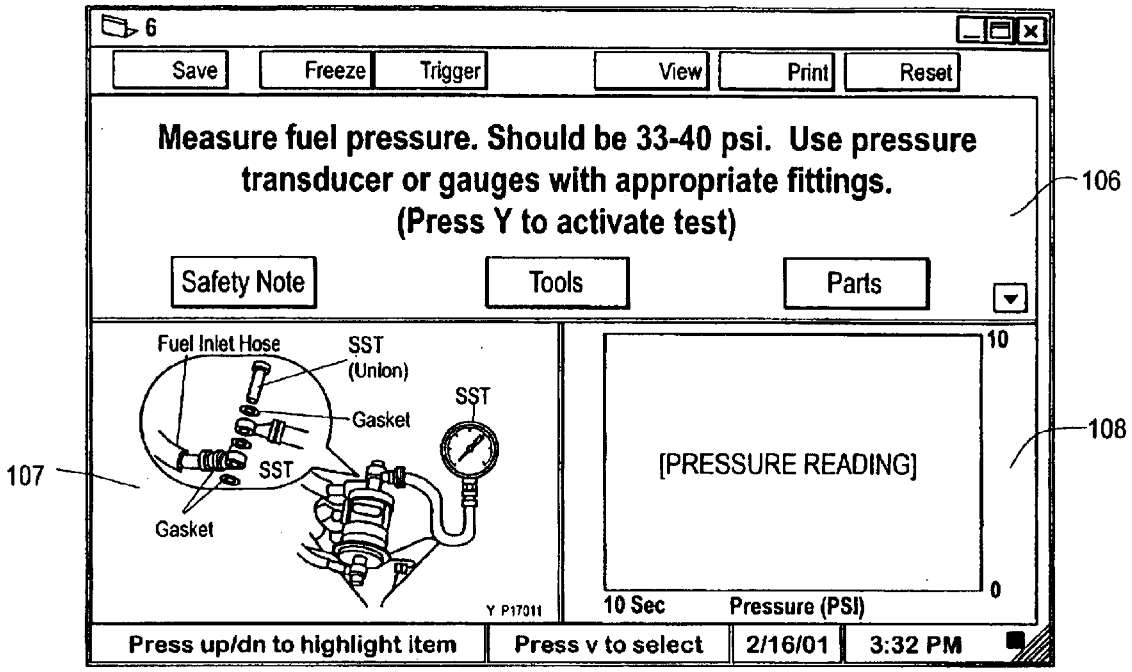
Figure 14:
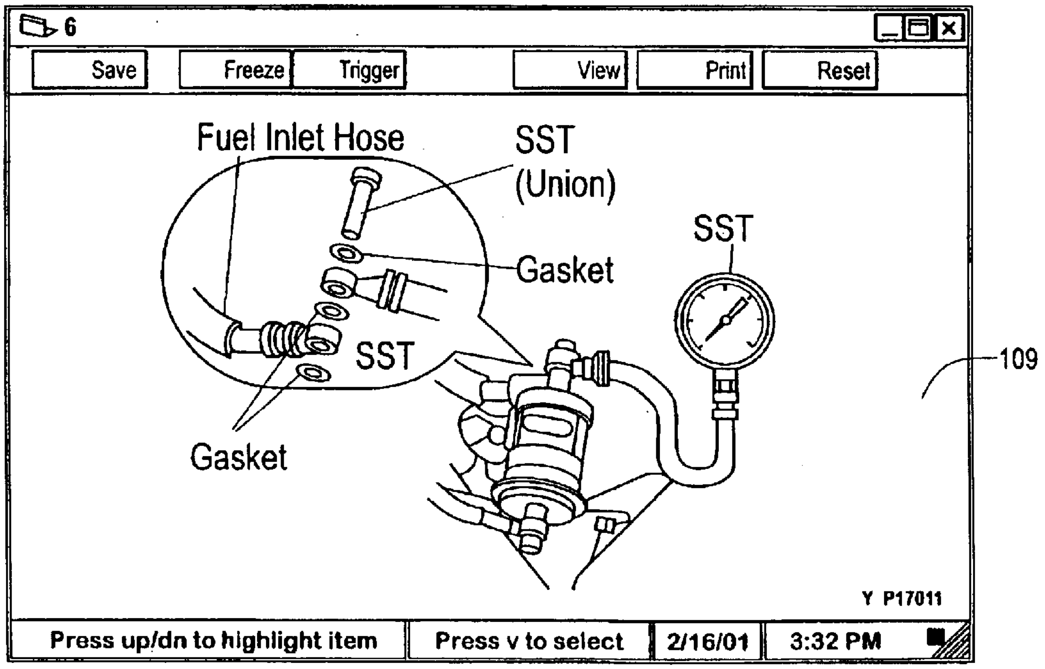

FIG. 13 illustrates another test which suggests taking a fuel pressure reading. The test instructions are illustrated at 106 in the upper window and describe where and how to best connect either a pressure gauge or pressure transducer. The left-hand portion of the lower window illustrates at 107 a diagram, as from the service manual, illustrating how to connect a pressure gauge. If the reading is taken from a transducer, it would be graphed directly onto the right-hand portion of the lower window, as at 108. The diagram 107 is shown enlarged at 109 in FIG. 14.

Referring further to FIG. 13, on this page, the "Safety Note" box, when clicked on, will advise the technician of safety precautions when measuring fuel pressure under driving conditions. For example, one such precaution might be: "When using a gauge to measure fuel pressure while driving requires a second person in the vehicle to monitor the gauge. Suggest taping the gauge to the windshield to avoid any leaking fluids from possibly getting on the upholstery." Another might be: "When using a pressure transducer to capture fuel pressure while driving, press the hold control when any unusual symptoms are felt. Min/max pressure values should only be reviewed after pulling off the road."

Also shown are other icons for links to ordering Tools and Equipment (in this case, part numbers for pressure gauges or pressure transducers), or ordering vehicle Parts (in this case, a short list of parts or part kits associated with the proper operation of the fuel pump). These Tools and Equipment and Parts links could be applicable to any of the previously shown screens.

Again, all of the information the technician needs is linked together on the screen, including readings, specifications, instructions and on-off control of fuel pump, tools and equipment, vehicle parts, etc.

Figure 15:
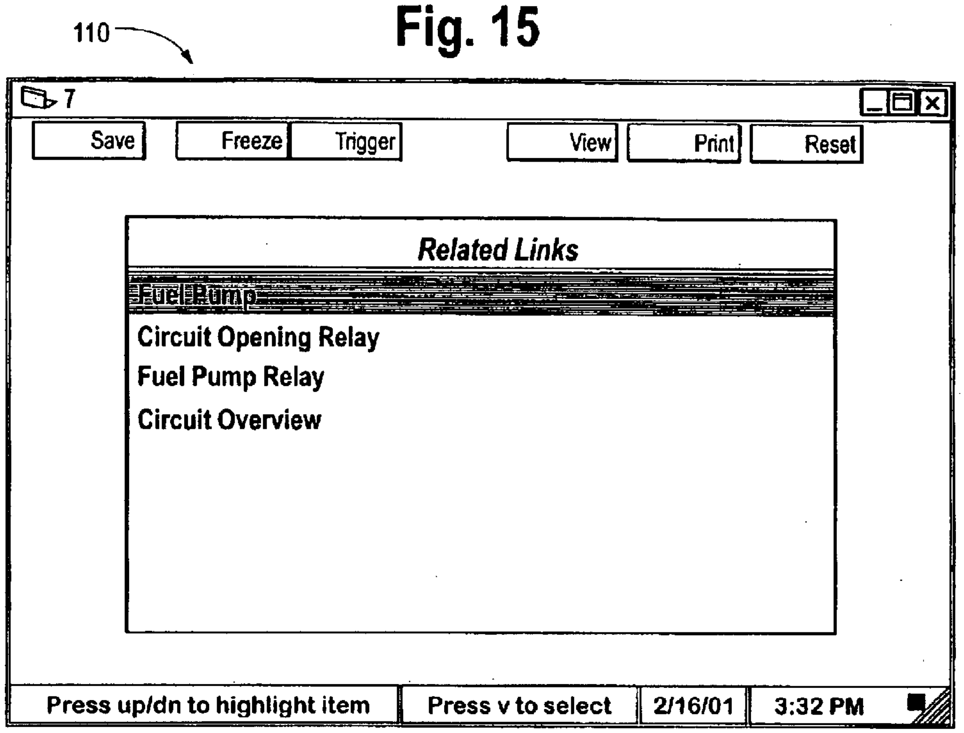
Figure 16:
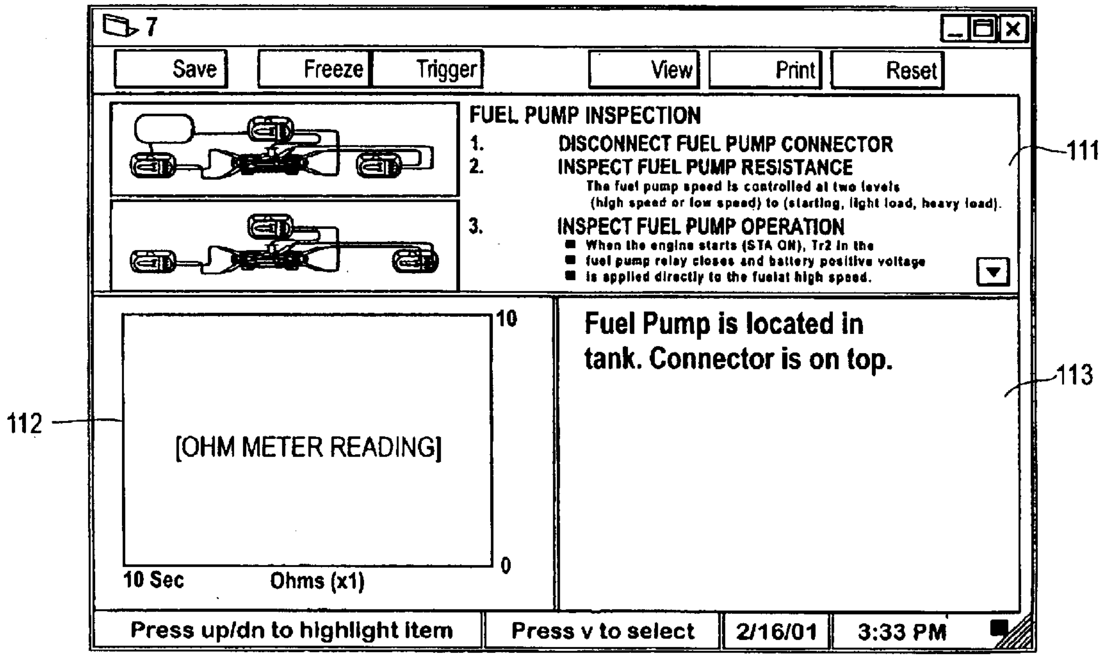

Referring now to FIG. 15, at the end of the list of test designations a screen 110 is displayed showing links to additional related tests or information. This is similar to the "related subjects" listings found at the end of an encyclopedia article. These can be other troubleshooting tips, component or system tests, reference documents or articles. In this case, the "Fuel Pump" link is highlighted and selection of that link will bring up the screen 111 of FIG. 16. This screen shows how the standard fuel pump inspection test from the vehicle manufacturer's service manual can be enhanced. The inspection calls for measuring resistance, so a graphical ohm meter is provided at 112 in the left-hand portion of the lower window. A description of the location of the fuel pump is set forth at 113 in the right-hand portion of the lower window.

Figure 17:
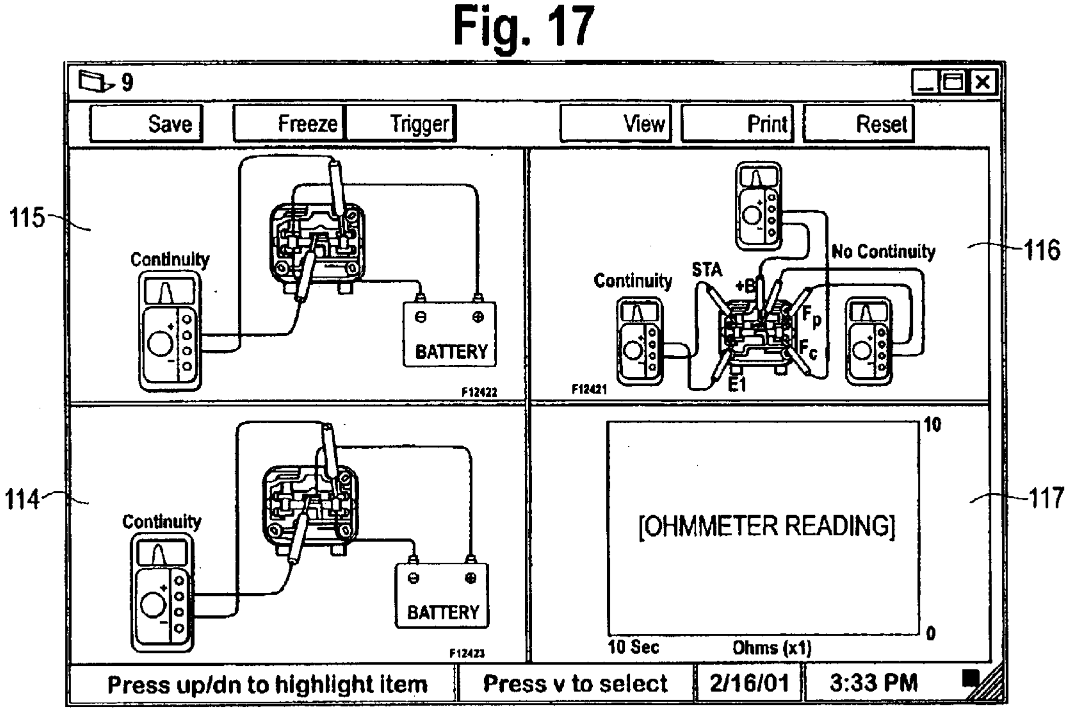

If, in FIG. 15, the "Circuit Opening Relay" item were selected, the screen 114 of FIG. 17 would appear. This screen has four windows, three of which at 114, 115 and 116 illustrate circuit connections for the test, while the fourth at 117 illustrates an ohm meter graph.

Figure 18:
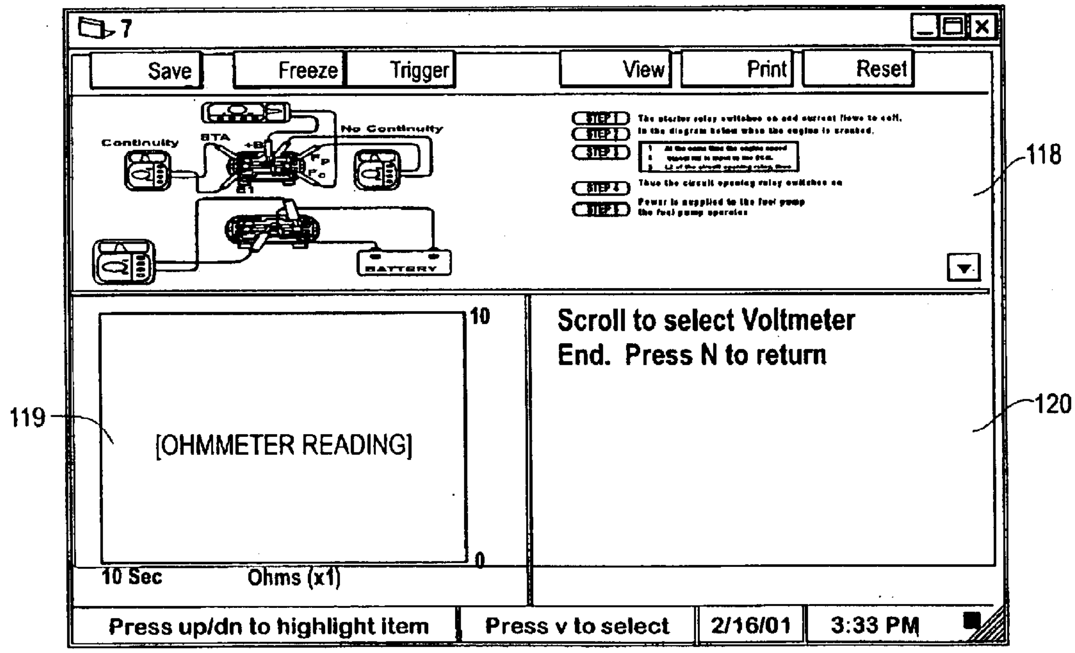

Referring to FIG. 18, there is illustrated a screen 118 for a test in which both voltage and resistance measurements are required in the vehicle manufacturer's referenced document. The meter is illustrated at 119, and a convenient means of switching the instrument between an ohm meter and a voltmeter is provided in the lower right-hand expert window 120.

It will be appreciated, that in other applications, which involve the display of a waveform from the associated vehicle or other apparatus being diagnosed, the setup of the screen display graph of the captured data might include trigger source, trigger threshold, etc. in addition to horizontal and vertical scaling.

While the foregoing has described only a single series of tests, it is illustrative of the general principles of the system 20. A significant advantage of the system is that it provides automatic linking to and display of support data responsive simply to the selection or display of a particular test page. No selection activity is required by the user. Furthermore, the support data can be derived from a wide variety of sources both local to and remote from the host system, and can be linked thereto in a number of different ways, including over the Internet.

If the other approaches 53, 54 or 56 of FIG. 3 were used, instead of a symptom-based approach, the operation would be similar to that described in FIG. 4, except that blocks 61, 64, 71 and 74 would be eliminated and, in block 62, the displayed list of test designations would be arranged differently. However, the automatic linking of support data with displayed test pages would still occur.

The embodiments described herein may be used with any desired system or engine. Those systems or engines may comprise items utilizing fossil fuels, such as gasoline, natural gas, propane and the like, electricity, such as that generated by battery, magneto, solar cell and the like, wind and hybrids or combinations thereof. Those systems or engines may be incorporated into another system, such as an automobile, a truck, a boat or ship, a motorcycle, a generator, an airplane and the like.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A directed service system comprising:

a processor operating under stored program control, a user interface including a display device and an input device both coupled to the processor for interactive control thereof and thereby, a storage utility storing a knowledge database including a library of service information items relating to aspects of an apparatus to be serviced and test information items relating to tests which can be performed on the apparatus, at least one source, distinct from the storage utility, of support data relating to particular tests, and a computer routine executed by the processor for controlling the operation of the display device and controlling communications with the storage utility and the at least one source of support data, the computer routine including (a) a first portion for controlling activation of and communication over communication links between the processor and the storage utility and between the processor and each source of support data, (b) a second portion responsive to user inputs via the user interface regarding selected aspects of the apparatus for displaying a test description applicable to the selected aspects, and (c) a third portion responsive to display of a test description for automatically retrieving from the at least one source of support data and displaying information related to the displayed test description to assist a user in implementing the test.

2. The system of claim 1, wherein the display device is controllable in a split-screen mode wherein the test description and the associated support data are respectively displayed on different portions of a display screen.

3. The system of claim 1, wherein the at least one source of support data includes plural sources of support data.

4. The system of claim 1, wherein the at least one source of support data includes an instrumentation source for acquiring live data from the apparatus.

5. The system of claim 4, wherein the instrumentation source includes a probe assembly for acquiring data signals from the apparatus.

6. The system of claim 5, wherein the display device is operable for real-time display of signals acquired by the probe assembly.

7. The system of claim 1, wherein the at least one source of support data includes an on-board monitoring and control device on the apparatus.

8. The system of claim 1, wherein the at least one source of support data includes a source of reference information.

9. The apparatus of claim 8, wherein the source of reference information includes service manual portions in electronic format.

10. The apparatus of claim 8, wherein the reference information source includes an expert database compiled from prior experience in servicing and diagnosing the apparatus.

11. The system of claim 1, wherein the processor is a personal computer.

12. The apparatus of claim 11, wherein the storage utility is local to the personal computer.

13. The system of claim 1, wherein one or more of the storage utility and the at least one source of support data are remote units disposed remote from the processor and the display device.

14. The system of claim 13, wherein at least one of the remote units resides at an Internet Web site.

15. The system of claim 1, and further comprising means for providing wireless communication between at least one of the remote units support data and the processor.

16. The system of claim 1, wherein the second portion of the computer routine includes a sub-portion responsive to user selection of one or more displayed service information items relating to symptoms for selecting from the library those tests applicable to diagnosing the cause of the symptoms, hierarchically arranging the selected tests in a list in the order of their likelihood of successfully diagnosing the cause of the symptoms, and displaying designations of the hierarchically arranged list of tests.

17. A method of servicing an apparatus, comprising:

providing a library of service information items relating to aspects of an apparatus to be serviced and test descriptions relating to tests which can be performed on the apparatus, providing at least one source, distinct from the library, of support data relating to particular tests, selecting and displaying on a display device test descriptions from the library, and as each test description is being displayed, and in response thereto, automatically retrieving from the at least one source of support data and displaying on the display device support data relating to the displayed test description.

18. The method of claim 17, wherein the displayed test description and the related support data are displayed simultaneously on the display device.

19. The method of claim 18, wherein the displayed test description and the related support data are displayed on separate portions of a display screen of the display device.

20. The method of claim 17, wherein one or more of the library and the at least one source of support data are remote units disposed remotely from the display device, and further comprising providing communication between the display device and the remote units.

21. The method of claim 17, wherein the step of providing at least one source of support data includes compiling a case-based expert database based on actual experience in servicing and diagnosing the apparatus.

22. The method of claim 17, wherein the step of providing at least one source of support data includes providing instrumentation for obtaining real-time signals from the apparatus.

23. The method of claim 17, wherein the step of providing at least one source of support data includes providing communication with an on-board monitoring and control device on the apparatus.

24. The method of claim 17, wherein the selecting and displaying step includes first displaying a collection of service information items relating to symptoms and then responding to user selection of one or more displayed service information items for selecting tests applicable to diagnosing of the cause of the symptoms related to the selected service information items, hierarchically arranging the selected tests in a list in the order of their likelihood of successfully diagnosing the cause of the symptoms, and displaying designations of the hierarchically arranged list of tests.

25. A directed service system comprising:

processing means operating under stored program control, user interface means including display means and data input means both coupled to the processing means for interactive control thereof and thereby, storage means for storing information relating to tests which can be performed on an apparatus for the purpose of servicing the apparatus, and support data means, distinct from the storage means, for providing support data relating to particular tests, the processing means including means for causing display on the display means of descriptions one or more tests, the processing means further including means responsive to display of a test description for automatically simultaneously causing display of support data received from the support data means and related to the displayed test description to assist a user in implementing the test.

26. The system of claim 25, wherein the processing means includes means for controlling the display means in a split-screen mode wherein the displayed test description and the related support data are respectively displayed on different portions of a display screen.

27. The system of claim 25, wherein one or more of the storage means and the support data means are remote units disposed remote from the processing means and the display means.

28. The system of claim 25, wherein the support data means includes a case-based expert database compiled from prior experience in servicing and diagnosing the apparatus.

29. The system of claim 25, wherein the support data means includes an instrumentation source for acquiring live data from the apparatus.

30. The system of claim 25, wherein the support data means includes an on-board monitoring and control device on the apparatus.

* * * * *